US012774579B2

(12) United States Patent
Suzuki et al.

(10) Patent No.: US 12,774,579 B2
(45) Date of Patent: Oct. 27, 2026

(54) SYSTEM AND METHOD FOR CONTROLLING WORK MACHINE

(71) Applicant: Komatsu Ltd., Tokyo (JP)

(72) Inventors: Hikaru Suzuki, Tokyo (JP); Tsutomu Iwamura, Tokyo (JP); Sho Nozaki, Tokyo (JP); Ryuji Kanda, Tokyo (JP); Daishi Iwanaga, Tokyo (JP); Tomokazu Hirao, Tokyo (JP); Yuta Uchida, Tokyo (JP); Yuki Shimano, Tokyo (JP); Jun Sasaki, Tokyo (JP); Jin Kitajima, Tokyo (JP)

(73) Assignee: Komatsu Ltd., Tokyo (JP)

( * ) Notice: Subject to any disclaimer, the term of this patent is extended or adjusted under 35 U.S.C. 154(b) by 252 days.

(21) Appl. No.: 18/684,009

(22) PCT Filed: Sep. 29, 2022

(86) PCT No.: PCT/JP2022/036490

§ 371 (c)(1),
(2) Date: Oct. 2, 2024

(87) PCT Pub. No.: WO2023/054603

PCT Pub. Date: Apr. 6, 2023

(65) Prior Publication Data

US 2025/0116085 A1 Apr. 10, 2025

(30) Foreign Application Priority Data

Sep. 30, 2021 (JP) ................................ 2021-161093

(51) Int. Cl.
*E02F 3/43* (2006.01)
*E02F 3/32* (2006.01)
(Continued)

(52) U.S. Cl.
CPC ............ *E02F 3/435* (2013.01); *E02F 3/3681* (2013.01); *G05D 3/12* (2013.01); *E02F 3/32* (2013.01); *E02F 9/2004* (2013.01)

(58) Field of Classification Search
CPC . E02F 3/435; E02F 3/3681; E02F 3/32; E02F 9/2004; E02F 3/3677; E02F 9/265;
(Continued)

(56) References Cited

U.S. PATENT DOCUMENTS

2017/0342679 A1 11/2017 Iwamura et al.
2022/0106773 A1 * 4/2022 Iwasaki .................. E02F 3/435
(Continued)

FOREIGN PATENT DOCUMENTS

JP 2020125599 A * 8/2020 ............. E02F 9/262
JP 2021-085216 A 6/2021
(Continued)

OTHER PUBLICATIONS

Iwasaki Yoshiro, Feb. 1, 2019 English Machine Translation_JP2020125599 A provided by Patent Translate by EPO and Google (Year: 2019).*

*Primary Examiner* — Ashley L Redhead, Jr.
(74) *Attorney, Agent, or Firm* — Fish & Richardson P.C.

(57) ABSTRACT

A measurement value acquisition unit acquires measurement values from a plurality of sensors. A posture calculation unit calculates a posture of an attachment with respect to a vehicle body based on the measurement values. An operation signal acquisition unit acquires an operation signal from an operation device. An intervention control unit generates a control signal for the tilt rotator so that the posture of the attachment is held, based on the operation signal. An output unit outputs the generated control signal.

9 Claims, 5 Drawing Sheets

(51) Int. Cl.

| | |
|---|---|
| ***E02F 3/36*** | (2006.01) |
| ***G05D 3/12*** | (2006.01) |
| *E02F 9/20* | (2006.01) |

(58) Field of Classification Search
CPC ......... E02F 3/43; E02F 3/3686; E02F 9/2025; G05D 3/12; B60Y 2200/412
See application file for complete search history.

(56) References Cited

U.S. PATENT DOCUMENTS

| | | | | |
|---|---|---|---|---|
| 2022/0403617 | A1 | 12/2022 | Matsuyama | |
| 2024/0208420 | A1* | 6/2024 | Satoh .................. | B60K 35/235 |

FOREIGN PATENT DOCUMENTS

| | | | |
|---|---|---|---|
| JP | 2021-134631 | A | 9/2021 |
| WO | WO 2016/186219 | A1 | 11/2016 |
| WO | 2021/171767 | A1 | 9/2021 |

* cited by examiner

SYSTEM AND METHOD FOR CONTROLLING WORK MACHINE

CROSS-REFERENCE TO RELATED APPLICATIONS

This application is a National Stage application under 35 U.S.C. § 371 of International Application No. PCT/JP2022/036490, filed on Sep. 29, 2022, which claims priority to Japanese Patent Application No. 2021-161093, filed Sep. 30, 2021. The contents of the prior applications are incorporated herein in their entirety.

TECHNICAL FIELD

The present disclosure relates to a system and a method for controlling a work machine.

BACKGROUND ART

Patent Document 1 discloses a technique of moving, in a work machine provided with a tilt bucket whose tooth angle can be inclined, the bucket along an inclined design surface. A tilt axis of the tilt bucket extends in an opening direction of the bucket.

CITATION LIST

Patent Document

[Patent Document 1]
PCT International Publication No. WO2016/186219

SUMMARY OF INVENTION

Technical Problem

Incidentally, there is known a component called a tilt rotator that rotatably supports an attachment of the work machine around three mutually orthogonal axes. By attaching the tilt rotator to the work machine, the attachment can be oriented in any direction. However, although the tilt rotator has a high degree of freedom of rotation, it is difficult for an operator to operate the tilt rotator. Patent Document 1 makes it possible to automate operations around the tilt axis, but does not disclose control of the work machine with the tilt rotator.

An object of the present disclosure is to provide a system and a method capable of assisting with an operation of a work machine provided with an attachment supported by a support portion via a tilt rotator.

Solution to Problem

According to one aspect of the present disclosure, there is provided a system for controlling a work machine including a support portion operably supported by a vehicle body, a tilt rotator attached to a tip of the support portion, and an attachment supported rotatably around three axes that intersect each other in different planes, by the support portion via the tilt rotator. The system includes a processor. The processor acquires measurement values from a plurality of sensors. The processor calculates a posture of an attachment with respect to a vehicle body based on the measurement values. The processor generates a control signal for the tilt rotator so that the posture of the attachment is held, based on an operation signal from an operation device, and outputs the generated control signal.

Advantageous Effects of Invention

According to the aspect described above, the system can assist with an operation of a work machine provided with an attachment supported by a support portion via a tilt rotator.

DESCRIPTION OF EMBODIMENTS

First Embodiment

<<Configuration of Work Machine>

Hereinafter, embodiments will be described in detail with reference to the drawings.

Figure 1:
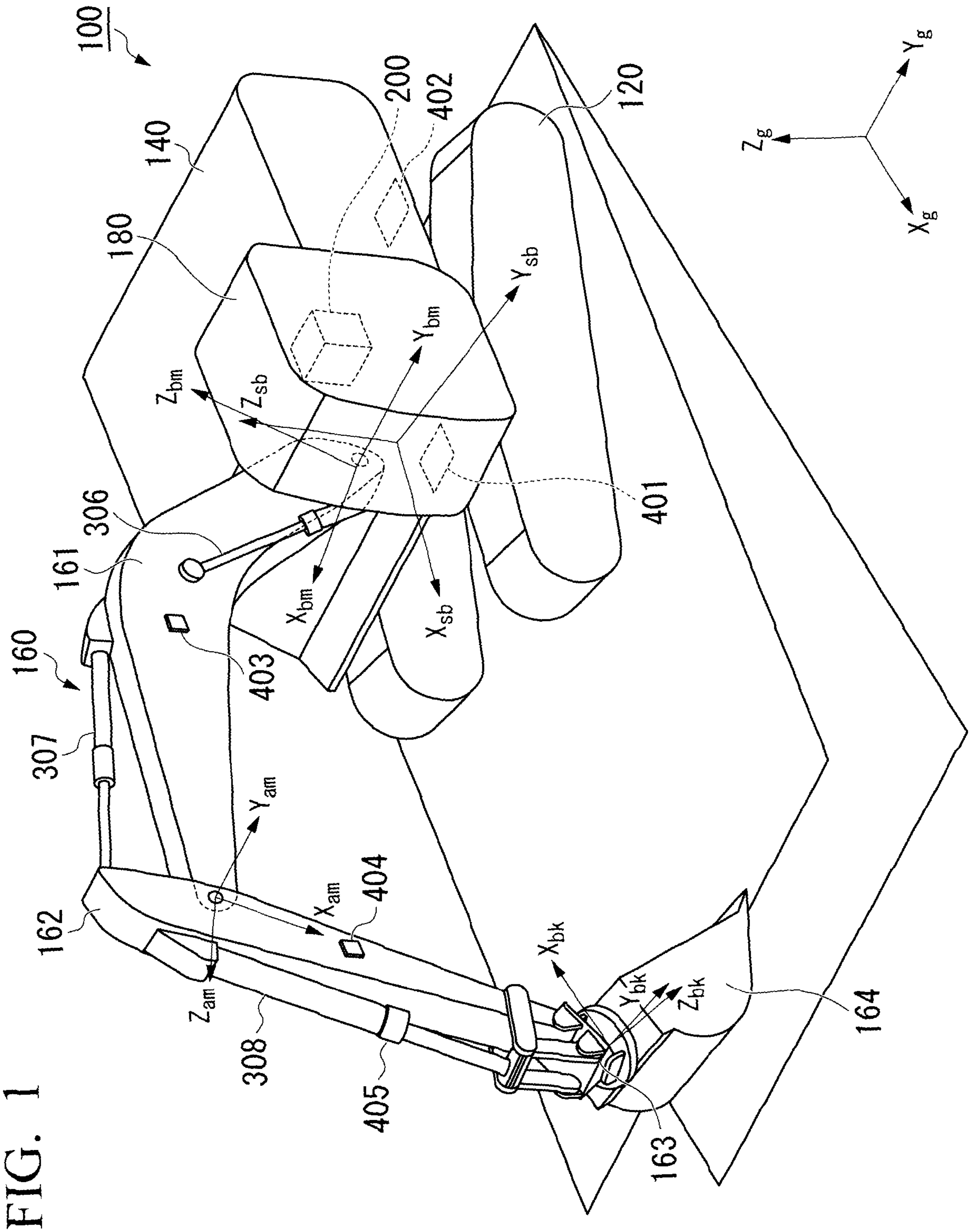
FIG. 1 is a schematic diagram showing a configuration of a work machine according to a first embodiment.

FIG. 1 is a schematic diagram showing a configuration of a work machine 100 according to a first embodiment. The work machine 100 according to the first embodiment is, for example, a hydraulic excavator. The work machine 100 includes an undercarriage 120, a swing body 140, work equipment 160, a cab 180, and a control device 200. The work machine 100 according to the first embodiment is controlled such that teeth of a bucket 164 do not move beyond a design surface.

The undercarriage 120 travelably supports the work machine 100. The undercarriage 120 is, for example, a pair of left and right endless tracks.

The swing body 140 is supported by the undercarriage 120 so as to be swingable around a swing center. The swing body 140 is an example of a vehicle body. The undercarriage 120 is an example of a base portion that swingably supports the swing body 140.

The work equipment 160 is operably supported by the swing body 140. The work equipment 160 is driven by hydraulic pressure. The work equipment 160 includes a boom 161, an arm 162, a tilt rotator 163, and a bucket 164 that is an attachment. A base end portion of the boom 161 is rotatably attached to the swing body 140. A base end portion of the arm 162 is rotatably attached to a tip portion of the boom 161. The tilt rotator 163 is rotatably attached to a tip portion of the arm 162. The bucket 164 is attached to the tilt rotator 163. The bucket 164 is supported rotatably around three axes that intersect each other in different planes, by the work equipment 160 via the tilt rotator 163. Here, a portion of the swing body 140 to which the work equipment 160 is attached is referred to as a front part. In addition, regarding the swing body 140, based on the front part, an opposite part is referred to as a rear part, a left part is referred to as a left part, and a right part is referred to as a right part. The boom 161 and the arm 162 are examples of a support portion operably supported by the swing body 140.

Figure 2:
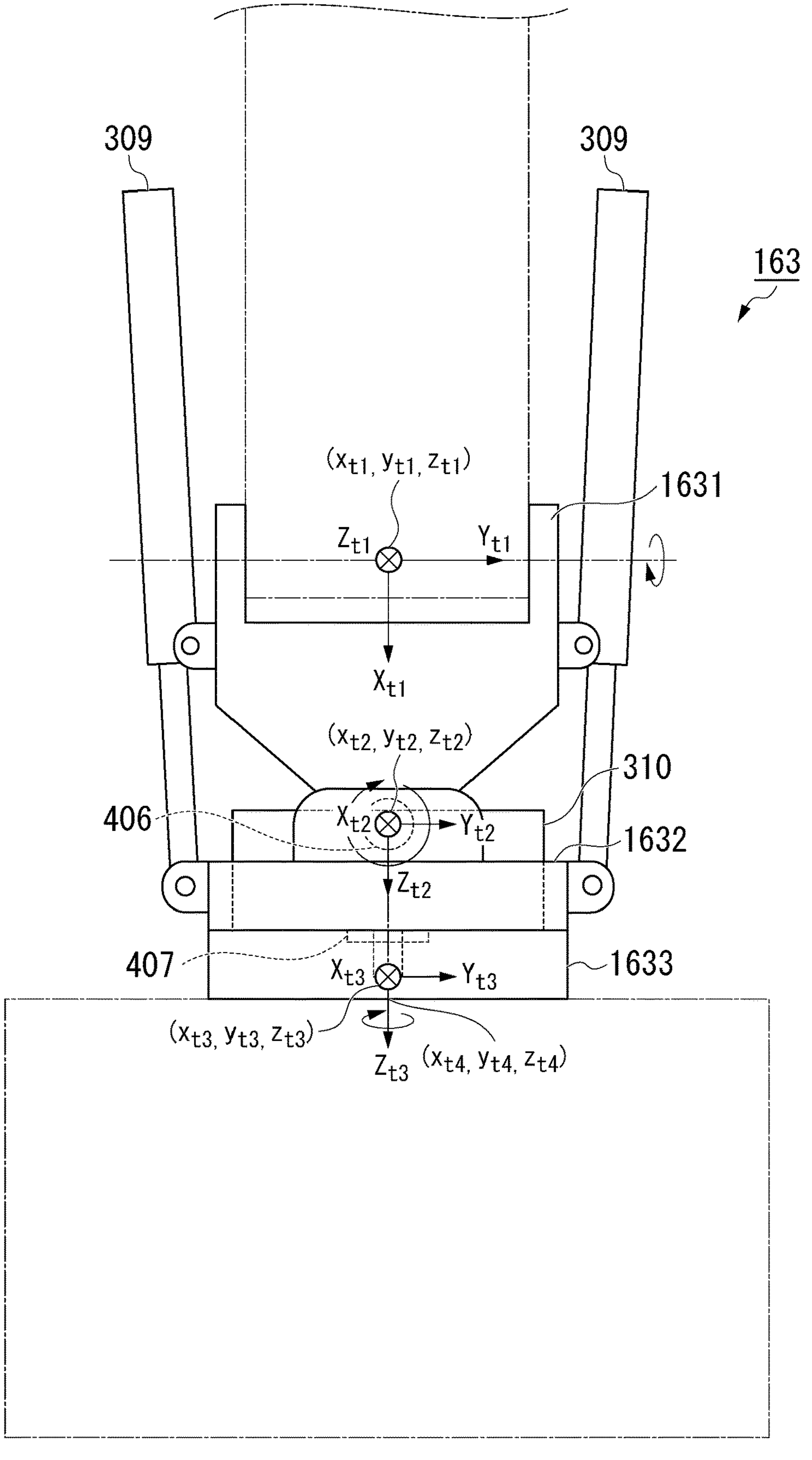
FIG. 2 is a diagram showing a configuration of a tilt rotator according to the first embodiment.

FIG. 2 is a diagram showing a configuration of the tilt rotator 163 according to the first embodiment. The tilt rotator 163 is attached to a tip of the arm 162 to support the bucket 164. The tilt rotator 163 includes an attachment portion 1631, a tilt portion 1632, and a rotation portion 1633. The attachment portion 1631 is attached to the tip of the arm 162 so as to be rotatable around an axis extending in a left-right direction in the drawing. The tilt portion 1632 is attached to the attachment portion 1631 so as to be rotatable around an axis extending in a front-rear direction shown in the drawing. The rotation portion 1633 is attached to the tilt portion 1632 so as to be rotatable around an axis extending in an up-down direction in the drawing. Ideally, the rotation axes of the attachment portion 1631, the tilt portion 1632, and the rotation portion 1633 are orthogonal to each other. A base end portion of the bucket 164 is fixed to the rotation portion 1633. Accordingly, the bucket 164 can rotate about three axes orthogonal to each other with respect to the arm 162. Note that, in practice, the rotation axes of the attachment portion 1631, the tilt portion 1632, and the rotation portion 1633 may include design errors and may not necessarily be orthogonal to each other.

The cab 180 is provided at the front part of the swing body 140. An operation device 271 for an operator to operate the work machine 100, and a monitor device 272 which is a human-machine interface of the control device 200 are provided in the cab 180. The operation device 271 receives, from the operator, inputs of an operation amount of a traveling motor 304, an operation amount of a swing motor 305, an operation amount of a boom cylinder 306, an operation amount of an arm cylinder 307, an operation amount of a bucket cylinder 308, an operation amount of a tilt cylinder 309, and an operation amount of a rotary motor 310. The operation device 271 outputs an operation signal indicating the operation amount of the work machine. The operation device 271 is operated by the operator and outputs operation signals for operating the boom 161 and the arm 162. The operation device 271 is operated by the operator and outputs an operation signal for swinging the swing body 140 with respect to the undercarriage 120. The operation device 271 is operated by the operator and outputs an operation signal for operating the tilt rotator 163. The monitor device 272 receives an input for setting and releasing bucket posture holding control from the operator. The bucket posture holding control means that the control device 200 automatically controls the bucket cylinder 308, the tilt cylinder 309, and the rotary motor 310 to hold a posture of the bucket 164 in a global coordinate system. The monitor device 272 is realized by, for example, a computer including a touch panel.

The control device 200 controls the undercarriage 120, the swing body 140, and the work equipment 160 based on the operation of the operation device 271 by the operator. The control device 200 is provided, for example, inside the cab 180.

<<Drive System of Work Machine 100>>

Figure 3:
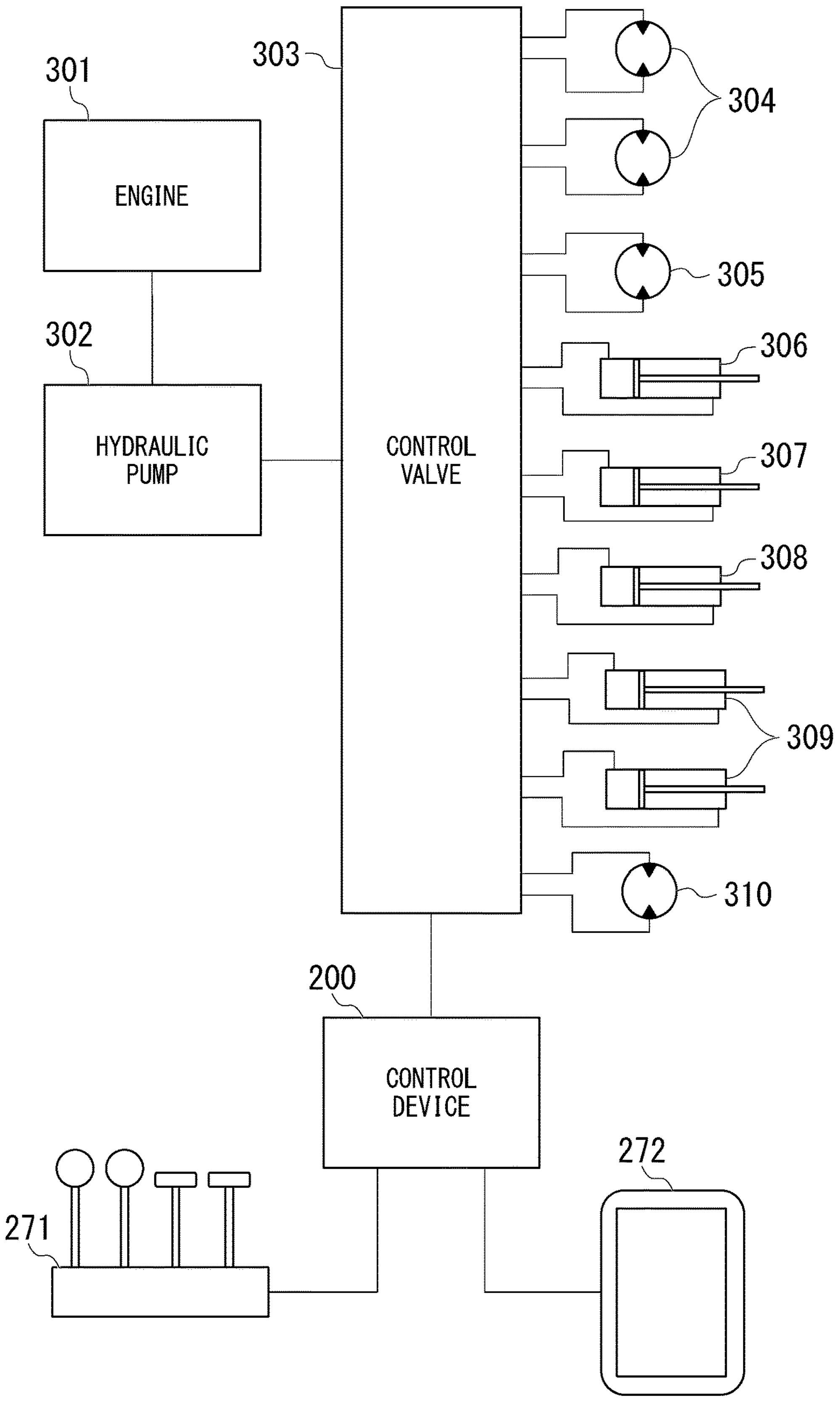
FIG. 3 is a diagram showing a drive system of the work machine according to the first embodiment.

FIG. 3 is a diagram showing a drive system of the work machine 100 according to the first embodiment.

The work machine 100 includes a plurality of actuators for driving the work machine 100. Specifically, the work machine 100 includes an engine 301, a hydraulic pump 302, a control valve 303, a pair of the traveling motors 304, the swing motor 305, the boom cylinder 306, the arm cylinder 307, the bucket cylinder 308, the tilt cylinder 309, and the rotary motor 310.

The engine 301 is a prime mover that drives the hydraulic pump 302.

The hydraulic pump 302 is driven by the engine 301 and supplies hydraulic oil to the traveling motor 304, the swing motor 305, the boom cylinder 306, the arm cylinder 307, and the bucket cylinder 308 via the control valve 303.

The control valve 303 controls a flow rate of the hydraulic oil to be supplied from the hydraulic pump 302 to the traveling motor 304, the swing motor 305, the boom cylinder 306, the arm cylinder 307, and the bucket cylinder 308.

The traveling motor 304 is driven by the hydraulic oil supplied from the hydraulic pump 302 to drive the undercarriage 120.

The swing motor 305 is driven by the hydraulic oil supplied from the hydraulic pump 302 to swing the swing body 140 with respect to the undercarriage 120.

The boom cylinder 306 is a hydraulic cylinder for driving the boom 161. A base end portion of the boom cylinder 306 is attached to the swing body 140. A tip portion of the boom cylinder 306 is attached to the boom 161.

The arm cylinder 307 is a hydraulic cylinder for driving the arm 162. A base end portion of the arm cylinder 307 is attached to the boom 161. A tip portion of the arm cylinder 307 is attached to the arm 162.

The bucket cylinder 308 is a hydraulic cylinder for driving the tilt rotator 163 and the bucket 164. A base end portion of the bucket cylinder 308 is attached to the arm 162. A tip portion of the bucket cylinder 308 is attached to the tilt rotator 163 via a link member.

The tilt cylinder 309 is a hydraulic cylinder for driving the tilt portion 1632. A base end portion of the tilt cylinder 309 is attached to the attachment portion 1631. A tip portion of the tilt cylinder 309 is attached to the tilt portion 1632.

The rotary motor 310 is a hydraulic motor for driving the rotation portion 1633. A bracket and stator of the rotary motor 310 are fixed to the tilt portion 1632. A rotary shaft and rotor of the rotary motor 310 are provided to extend in the up-down direction in the drawing and are fixed to the rotation portion 1633.

<<Measurement System of Work Machine 100>>

The work machine 100 includes a plurality of sensors for measuring a posture, an azimuth direction, and a position of the work machine 100. Specifically, the work machine 100 includes an inclination measurer 401, a position and azimuth direction measurer 402, a boom angle sensor 403, an arm angle sensor 404, a bucket angle sensor 405, a tilt angle sensor 406, and a rotation angle sensor 407.

The inclination measurer 401 measures a posture of the swing body 140. The inclination measurer 401 measures an inclination (for example, a roll angle, a pitch angle, and a yaw angle) of the swing body 140 with respect to a horizontal plane. As the inclination measurer 401, an inertial measurement unit (IMU) is an exemplary example. In this case, the inclination measurer 401 measures an acceleration and angular velocity of the swing body 140, and calculates the inclination of the swing body 140 with respect to the horizontal plane based on a measurement result. The inclination measurer 401 is installed, for example, below the cab 180. The inclination measurer 401 outputs posture data of the swing body 140 to the control device 200 as a measurement value.

The position and azimuth direction measurer 402 measures a position of a representative point of the swing body 140 and an azimuth direction in which the swing body 140 faces, by a global navigation satellite system (GNSS). The position and azimuth direction measurer 402 includes, for example, two GNSS antennas (not shown) attached to the swing body 140, and detects an azimuth direction orthogonal to a straight line connecting positions of the two antennas as the azimuth direction in which the work machine 100 faces. The position and azimuth direction measurer 402 outputs position data and azimuth direction data of the swing body 140 to the control device 200 as measurement values.

The boom angle sensor 403 measures a boom angle which is an angle of the boom 161 with respect to the swing body 140. The boom angle sensor 403 may be an IMU attached to the boom 161. In this case, the boom angle sensor 403 measures the boom angle based on the inclination of the boom 161 with respect to the horizontal plane and the inclination of the swing body measured by the inclination measurer 401. The measurement value of the boom angle sensor 403 indicates zero, for example, when a direction of a straight line passing through a base end and a tip of the boom 161 matches the front-rear direction of the swing body 140. The boom angle sensor 403 according to another embodiment may be a stroke sensor attached to the boom cylinder 306. In addition, the boom angle sensor 403 according to another embodiment may be a rotation sensor provided on a joint shaft that rotatably connects the swing body 140 and the boom 161. The boom angle sensor 403 outputs boom angle data to the control device 200 as the measurement value.

The arm angle sensor 404 measures an arm angle which is the angle of the arm 162 with respect to the boom 161. The arm angle sensor 404 may be an IMU attached to the arm 162. In this case, the arm angle sensor 404 measures the arm angle based on the inclination of the arm 162 with respect to the horizontal plane and the boom angle measured by the boom angle sensor 403. The measurement value of the arm angle sensor 404 indicates zero, for example, when a direction of a straight line passing through a base end and a tip of the arm 162 matches the direction of the straight line passing through the base end and the tip of the boom 161. The arm angle sensor 404 according to another embodiment may calculate an angle by attaching a stroke sensor to the arm cylinder 307. In addition, the arm angle sensor 404 according to another embodiment may be a rotation sensor provided on a joint shaft that rotatably connects the boom 161 and the arm 162. The arm angle sensor 404 outputs arm angle data to the control device 200 as the measurement value.

The bucket angle sensor 405 measures a bucket angle which is an angle of the tilt rotator 163 with respect to the arm 162. The bucket angle sensor 405 may be a stroke sensor provided on the bucket cylinder 308. In this case, the bucket angle sensor 405 measures the bucket angle based on a stroke amount of the bucket cylinder 308. The measurement value of the bucket angle sensor 405 indicates zero, for example, when a direction of a straight line passing through a base end and teeth of the bucket 164 matches the direction of the straight line passing through the base end and the tip of the arm 162. The bucket angle sensor 405 according to another embodiment may be a rotation sensor provided on a joint shaft that rotatably connects the arm 162 and the attachment portion 1631 of the tilt rotator 163. In addition, the bucket angle sensor 405 according to another embodiment may be an IMU attached to the bucket 164. The bucket angle sensor 405 outputs bucket angle data to the control device 200 as the measurement value.

The tilt angle sensor 406 measures a tilt angle which is an angle of the tilt portion 1632 with respect to the attachment portion 1631 of the tilt rotator 163. The tilt angle sensor 406 may be a rotation sensor provided on a joint shaft that rotatably connects the attachment portion 1631 and the tilt portion 1632. The measurement value of the tilt angle sensor 406 indicates zero, for example, when the rotation axis of the arm 162 and the rotation axis of the rotation portion 1633 are orthogonal to each other. The tilt angle sensor 406 according to another embodiment may calculate an angle by attaching a stroke sensor to the tilt cylinder 309. The tilt angle sensor 406 outputs tilt angle data to the control device 200 as the measurement value.

The rotation angle sensor 407 measures a rotation angle which is an angle of the rotation portion 1633 with respect to the tilt portion 1632 of the tilt rotator 163. The rotation angle sensor 407 may be a rotation sensor provided on the rotary motor 310. The measurement value of the tilt angle sensor 406 indicates zero, for example, when a direction in which the teeth of the bucket 164 face and an operation plane of the work equipment 160 are parallel to each other. The rotation angle sensor 407 outputs rotation angle data to the control device 200 as the measurement value.

<<Configuration of Control Device 200>>

Figure 4:
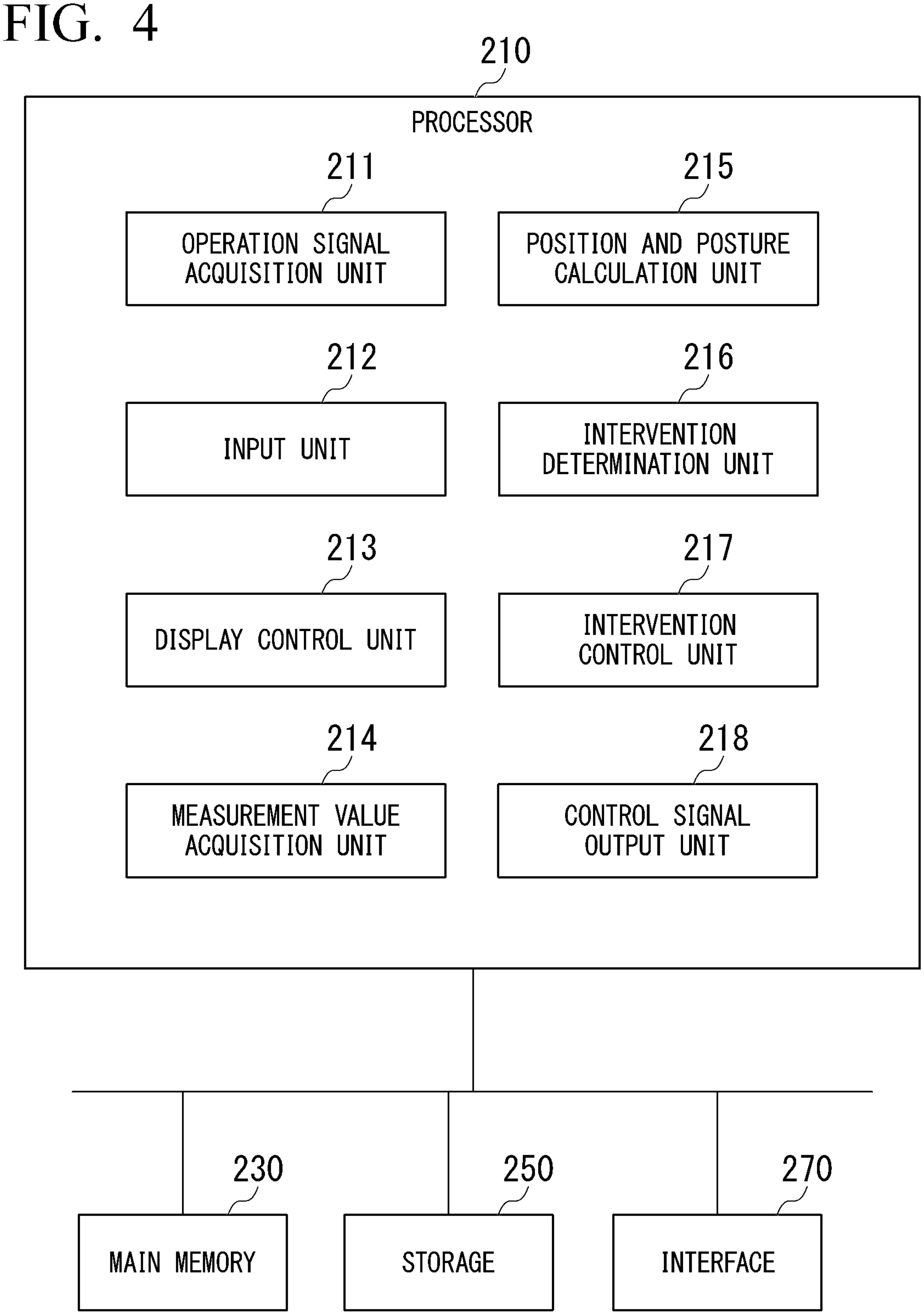
FIG. 4 is a schematic block diagram showing a configuration of a control device according to the first embodiment.

FIG. 4 is a schematic block diagram showing a configuration of the control device 200 according to the first embodiment.

The control device 200 is a computer that includes a processor 210, a main memory 230, a storage 250, and an interface 270. The control device 200 is an example of a control system. The control device 200 receives the measurement values from the inclination measurer 401, the position and azimuth direction measurer 402, the boom angle sensor 403, the arm angle sensor 404, the bucket angle sensor 405, the tilt angle sensor 406, and the rotation angle sensor 407.

The storage 250 is a non-transitory and tangible storage medium. As the storage 250, a magnetic disk, an optical disk, a magneto-optical disk, and a semiconductor memory are exemplary examples. The storage 250 may be internal media directly connected to a bus of the control device 200, or may be external media connected to the control device 200 via the interface 270 or a communication line. The operation device 271 and the monitor device 272 are connected to the processor 210 via the interface 270.

The storage 250 stores a control program for controlling the work machine 100. The control program may be used for realizing some functions to be performed by the control device 200. For example, the control program may function in combination with another program already stored in the storage 250 or in combination with another program installed in another device. In addition, in another embodiment, the control device 200 may include a custom large scale integrated circuit (LSI) such as a programmable logic device (PLD) in addition to or instead of the above configuration. As the PLD, a programmable array logic (PAL), a generic array logic (GAL), a complex programmable logic device (CPLD), and a field programmable gate array (FPGA) are exemplary examples. In this case, some or all of the functions realized by the processor may be realized by the integrated circuit.

In the storage 250, geometric data representing dimensions and positions of the center of gravity of the swing body 140, the boom 161, the arm 162, and the bucket 164 is recorded. The geometric data is data representing a position of an object in a predetermined coordinate system. In addition, design surface data, which is three-dimensional data representing a shape of the design surface of a construction site in the global coordinate system, is recorded in the storage 250. The global coordinate system is a coordinate system formed of an $X_g$ axis extending in a latitudinal direction, a $Y_g$ axis extending in a longitudinal direction, and a $Z_g$ axis extending in a vertical direction. The design surface data is represented by, for example, Triangular Irregular Networks (TIN) data.

<<Software Configuration>>

The processor 210 executes the control program to include an operation signal acquisition unit 211, an input unit 212, a display control unit 213, a measurement value acquisition unit 214, a position and posture calculation unit 215, an intervention determination unit 216, an intervention control unit 217, and a control signal output unit 218.

The operation signal acquisition unit 211 acquires an operation signal indicating an operation amount of each actuator from the operation device 271.

The input unit 212 receives an operation input by the operator from the monitor device 272.

The display control unit 213 outputs screen data to be displayed on the monitor device 272 to the monitor device 272.

The measurement value acquisition unit 214 acquires the measurement values from the inclination measurer 401, the position and azimuth direction measurer 402, the boom angle sensor 403, the arm angle sensor 404, the bucket angle sensor 405, the tilt angle sensor 406, and the rotation angle sensor 407.

The position and posture calculation unit 215 calculates the position and posture of the work machine 100 in the global coordinate system and in a vehicle body coordinate system based on various measurement values acquired by the measurement value acquisition unit 214 and the geometric data recorded in the storage 250. For example, the position and posture calculation unit 215 calculates a position and posture of the teeth of the bucket 164 in the global coordinate system and in the vehicle body coordinate system. The vehicle body coordinate system is an orthogonal coordinate system whose origin is a representative point (for example, a point passing through the swing center) of the swing body 140. The calculation of the position and posture calculation unit 215 will be described below. The position and posture calculation unit 215 is an example of a posture calculation unit that calculates the posture of the bucket 164 with respect to the swing body 140.

The intervention determination unit 216 determines whether or not to limit a speed of the work equipment 160 based on a positional relationship between the position of the teeth of the bucket 164 calculated by the position and posture calculation unit 215 and the design surface indicated by the design surface data. Hereinafter, limiting the speed of the work equipment 160 by the control device 200 is also referred to as intervention control. Specifically, the intervention determination unit 216 obtains the shortest distance between the design surface and the bucket 164, and determines to perform the intervention control on the work equipment 160 in a case where the shortest distance is equal to or less than a predetermined distance. Specifically, the intervention determination unit 216 rotates and translates the design surface data recorded in the storage 250 based on the measurement values of the inclination measurer 401 and the position and azimuth direction measurer 402, thereby transforming the position of the design surface represented by the global coordinate system to the position of the vehicle body coordinate system. The intervention determination unit 216 specifies, as a control point, a contour point closest to the design surface among a plurality of contour points of the bucket 164. The intervention determination unit 216 specifies a surface (polygon) located vertically below the control point in the design surface data. The intervention determination unit 216 calculates a first design line that is an intersection line between the specified surface and a surface parallel to an $X_{bk}$-$Z_{bk}$ plane of a bucket coordinate system passing through the control point. The intervention determination unit 216 determines whether or not a distance between the control point and the first design line is equal to or less than an intervention threshold value. In addition, the intervention determination unit 216 determines whether or not the bucket posture holding control is set based on whether or not the input unit 212 has received an input for setting or releasing the bucket posture holding control from the monitor device 272.

In a case where the intervention determination unit 216 determines to perform the intervention control, the intervention control unit 217 controls an operation amount of an intervention target among the operation amounts acquired by the operation signal acquisition unit 211. In the intervention control, the intervention control unit 217 controls an operation amount of the boom 161 so that the work equipment 160 does not enter a design line. Accordingly, the boom 161 operates such that a speed of the bucket 164 becomes a speed corresponding to a distance between the bucket 164 and the design line. In other words, when the operator operates the arm 162 to perform excavation work, the intervention control unit 217 limits the speed of the teeth of the bucket 164 by raising the boom 161 in accordance with the design surface.

The control signal output unit 218 outputs the operation amount acquired by the operation signal acquisition unit 211 or the operation amount controlled by the intervention control unit 217 to the control valve 303.

<<Calculation of Position and Posture Calculation Unit 215>>

Here, a method for calculating a position of a point on an outer shell of the work machine 100 by the position and posture calculation unit 215 will be described. The position and posture calculation unit 215 calculates the position of the point on the outer shell based on various measurement values acquired by the measurement value acquisition unit 214 and the geometric data recorded in the storage 250. In the storage 250, geometric data representing dimensions of the swing body 140, the boom 161, the arm 162, the tilt rotator 163 (the attachment portion 1631, the tilt portion 1632, and the rotation portion 1633), and the bucket 164 is recorded.

The geometric data of the swing body 140 indicates a center position ($x_{bm}$, $y_{bm}$, $z_{bm}$) of the joint shaft by which the swing body 140 supports the boom 161 in the vehicle body coordinate system that is a local coordinate system. The vehicle body coordinate system is a coordinate system formed of an $X_{sb}$ axis extending in the front-rear direction, a $Y_{sb}$ axis extending in the left-right direction, and a $Z_{sb}$ axis extending in the up-down direction based on the swing center of the swing body 140. The up-down direction of the swing body 140 does not necessarily match the vertical direction.

The geometric data of the boom 161 indicates a position ($x_{am}$, $y_{am}$, $z_{am}$) of the joint shaft by which the boom 161 supports the arm 162 in a boom coordinate system that is a local coordinate system. The boom coordinate system is a coordinate system formed of an $X_{bm}$ axis extending in a longitudinal direction, a $Y_{bm}$ axis extending in a direction in which the joint shaft extends, and a $Z_{bm}$ axis orthogonal to the $X_{bm}$ axis and the $Y_{bm}$ axis based on the center position of the joint shaft by which the swing body 140 and the boom 161 are connected.

The geometric data of the arm 162 indicates a position ($x_{t1}$, $y_{t1}$, $z_{t1}$) of the joint shaft by which the arm 162 supports the attachment portion 1631 of the tilt rotator 163 in an arm coordinate system that is a local coordinate system. The arm coordinate system is a coordinate system formed of an $X_{am}$ axis extending in the longitudinal direction, a $Y_{am}$ axis extending in a direction in which the joint shaft extends, and a $Z_{am}$ axis orthogonal to the $X_{am}$ axis and the $Y_{am}$ axis based on the center position of the joint shaft by which the boom 161 and the arm 162 are connected.

The geometric data of the attachment portion 1631 of the tilt rotator 163 indicates a position ($x_{t2}$, $y_{t2}$, $z_{t2}$) of the joint shaft by which the attachment portion 1631 supports the tilt portion 1632 and an inclination ($\varphi_t$) of the joint shaft in a first tilt-rotate coordinate system that is the local coordinate system. The inclination $\varphi_t$ of the joint shaft is an angle related to a design error of the tilt rotator 163, and is obtained by calibration of the tilt rotator 163 or the like. The first tilt-rotate coordinate system is a coordinate system formed of a $Y_{t1}$ axis extending in a direction in which the joint shaft by which the arm 162 and the attachment portion 1631 are connected extends, a $Z_{t1}$ axis extending in a direction in which the joint shaft by which the attachment portion 1631 and the tilt portion 1632 are connected extends, and an $X_{t1}$ axis orthogonal to the Yu axis and the $Z_{t1}$ axis based on the center position of the joint shaft by which the arm 162 and the attachment portion 1631 are connected.

The geometric data of the tilt portion 1632 of the tilt rotator 163 indicates a tip position ($x_{t3bk}$, $y_{t3}$, $z_{t3}$) of the rotary shaft of the rotary motor 310 and an inclination ($\varphi_r$) of the rotary shaft in a second tilt-rotate coordinate system that is the local coordinate system. The inclination or of the rotary shaft is an angle related to a design error of the tilt rotator 163, and is obtained by calibration of the tilt rotator 163 or the like. The second tilt-rotate coordinate system is a coordinate system formed of an $X_{t2}$ axis extending in a direction in which the joint shaft by which the attachment portion 1631 and the tilt portion 1632 are connected extends, a $Z_{t2}$ axis extending in a direction in which the rotary shaft of the rotary motor 310 extends, and a $Y_{t2}$ axis orthogonal to the $X_{t2}$ axis and the $Z_{t2}$ axis based on the center position of the joint shaft by which the attachment portion 1631 and the tilt portion 1632 are connected.

The geometric data of the rotation portion 1633 of the tilt rotator 163 indicates a center position ($z_{t4}$, $y_{t4}$, $z_{t4}$) of the attachment surface of the bucket 164 in a third tilt-rotate coordinate system that is the local coordinate system. The third tilt-rotate coordinate system is a coordinate system formed of a $Z_{t3}$ axis extending in a direction in which the rotary shaft of the rotary motor 310 extends, and an $X_{t3}$ axis and a $Y_{t3}$ axis orthogonal to the rotary shaft based on the center position of the attachment surface of the bucket 164. The bucket 164 is attached to the rotation portion 1633 such that the teeth are parallel to the $Y_{t3}$ axis.

The geometric data of the bucket 164 indicates positions ($x_{bk}$, $y_{bk}$, $z_{bk}$) of the plurality of contour points of the bucket 164 in the third tilt-rotate coordinate system. As the contour points, positions of both ends and the center of the teeth of the bucket 164, positions of both ends and the center of a bottom portion of the bucket 164, and positions of both ends and the center of a heel portion of the bucket 164 are exemplary examples.

The position and posture calculation unit 215 generates a boom-vehicle body transformation matrix $$T_{sb}^{bm}$$

for performing transformation from the boom coordinate system to the vehicle body coordinate system by using Expression (1), based on the measurement value of the boom angle $\theta_{bm}$ acquired by the measurement value acquisition unit 214 and the geometric data of the swing body 140. The boom-vehicle body transformation matrix $$T_{sb}^{bm}$$

is a matrix for rotation around the $Y_{bm}$ axis by the boom angle $\theta_{bm}$ and translation by a deviation ($x_{bm}$, $y_{bm}$, $z_{bm}$) between the origin of the vehicle body coordinate system and the origin of the boom coordinate system.

$$T_{sb}^{bm} = \begin{bmatrix} \cos\theta_{bm} & 0 & \sin\theta_{bm} & x_{bm} \\ 0 & 1 & 0 & y_{bm} \\ -\sin\theta_{bm} & 0 & \cos\theta_{bm} & z_{bm} \\ 0 & 0 & 0 & 1 \end{bmatrix} \tag{1}$$

The position and posture calculation unit 215 generates an arm-boom transformation matrix $$T_{bm}^{am}$$

for performing transformation from the arm coordinate system to the boom coordinate system by using Expression (2), based on the measurement value of the arm angle $\theta_{am}$ acquired by the measurement value acquisition unit 214 and the geometric data of the boom 161. The arm-boom transformation matrix $$T_{bm}^{am}$$

is a matrix for rotation by the arm angle $\theta_{am}$ around the $Y_{am}$ axis and translation by a deviation ($x_{am}$, $y_{am}$, $z_{am}$) between the origin of the boom coordinate system and the origin of the arm coordinate system. In addition, the position and posture calculation unit 215 generates an arm-vehicle body transformation matrix $$T_{sb}^{am}$$

for performing transformation from the arm coordinate system to the vehicle body coordinate system by obtaining a product of the boom-vehicle body transformation matrix $$T_{sb}^{bm}$$

and the arm-boom transformation matrix $$T_{bm}^{am}.$$

$$T_{bm}^{am} = \begin{bmatrix} \cos\theta_{am} & 0 & \sin\theta_{am} & x_{am} \\ 0 & 1 & 0 & y_{am} \\ -\sin\theta_{am} & 0 & \cos\theta_{am} & z_{am} \\ 0 & 0 & 0 & 1 \end{bmatrix} \quad (2)$$

The position and posture calculation unit 215 generates a first tilt-arm transformation matrix $$T_{am}^{t1}$$

for performing transformation from the first tilt-rotate coordinate system to the arm coordinate system by using Expression (3), based on the measurement value of the bucket angle $\theta_{bk}$ acquired by the measurement value acquisition unit 214 and the geometric data of the arm 162. The first tilt-arm transformation matrix $$T_{am}^{t1}$$

is a matrix for rotation by the bucket angle $\theta_{bk}$ around the $Y_{t1}$ axis, translation by a deviation ($x_{t1}$, $y_{t1}$, $z_{t1}$) between the origin of the arm coordinate system and the origin of the first tilt-rotate coordinate system, and further inclination by the inclination or of the joint shaft of the tilt portion 1632. In addition, the position and posture calculation unit 215 generates a first tilt-vehicle body transformation matrix $$T_{sb}^{t1}$$

for performing transformation from the first tilt-rotate coordinate system to the vehicle body coordinate system by obtaining a product of the arm-vehicle body transformation matrix $$T_{sb}^{am}$$

and the first tilt-arm transformation matrix $$T_{am}^{t1}.$$

$$T_{am}^{t1} = \begin{bmatrix} \cos(\theta_{bk} - \phi_t) & 0 & \sin(\theta_{bk} - \phi_t) & x_{t1} \\ 0 & 1 & 0 & y_{t1} \\ -\sin(\theta_{bk} - \phi_t) & 0 & \cos(\theta_{bk} - \phi_t) & z_{t1} \\ 0 & 0 & 0 & 1 \end{bmatrix} \quad (3)$$

The position and posture calculation unit 215 generates a second tilt-first tilt transformation matrix $$T_{t1}^{t2}$$

for performing transformation from the first tilt-rotate coordinate system to the second tilt-rotate coordinate system by using Expression (4), based on the measurement value of the tilt angle $\theta_t$ acquired by the measurement value acquisition unit 214 and the geometric data of the tilt rotator 163. The second tilt-first tilt transformation matrix $$T_{t1}^{t2}$$

is a matrix for rotation by the tilt angle $\theta_t$ around the $X_{t2}$ axis, translation by a deviation ($x_{t2}$, $y_{t2}$, $z_{t2}$) between the origin of the first tilt-rotate coordinate system and the origin of the second tilt-rotate coordinate system, and further inclination by the inclination or of the rotation axis of the rotation portion 1633. In addition, the position and posture calculation unit 215 generates a second tilt-vehicle body transformation matrix $$T_{sb}^{t2}$$

for performing transformation from the second tilt-rotate coordinate system to the vehicle body coordinate system by obtaining a product of the first tilt-vehicle body transformation matrix $$T_{sb}^{t1}$$

and the second tilt-first tilt transformation matrix $$T_{t1}^{t2}.$$

$$T_{t1}^{t2} = \begin{bmatrix} 1 & 0 & 0 & x_{t2} \\ 0 & \cos\theta_t & -\sin\theta_t & y_{t2} \\ 0 & \sin\theta_t & \cos\theta_t & z_{t2} \\ 0 & 0 & 0 & 1 \end{bmatrix} \begin{bmatrix} \cos\phi_r & 0 & \sin\phi_r & 0 \\ 0 & 1 & 0 & 0 \\ -\sin\phi_r & 0 & \cos\phi_r & 0 \\ 0 & 0 & 0 & 1 \end{bmatrix} \quad (4)$$

The position and posture calculation unit 215 generates a third tilt-second tilt transformation matrix $$T_{t2}^{t3}$$

for performing transformation from the second tilt-rotate coordinate system to the third tilt-rotate coordinate system by using Expression (5), based on the measurement value of the rotation angle $\theta_r$ acquired by the measurement value acquisition unit 214 and the geometric data of the tilt rotator 163. The third tilt-second tilt transformation matrix $$T_{t2}^{t3}$$

is a matrix for rotation by the rotation angle $\theta_r$ around the Z axis, and translation by a deviation ($x_{t3}$, $y_{t3}$, $z_{t3}$) between the origin of the second tilt-rotate coordinate system and the origin of the third tilt-rotate coordinate system. In addition, the position and posture calculation unit 215 generates a third tilt-vehicle body transformation matrix $$T_{sb}^{t3}$$

for performing transformation from the third tilt-rotate coordinate system to the vehicle body coordinate system by obtaining a product of the second tilt-vehicle body transformation matrix $$T_{sb}^{t2}$$

and the third tilt-second tilt transformation matrix $$T_{t2}^{t3}.$$

$$T_{t2}^{t3} = \begin{bmatrix} \cos\theta_r & -\sin\theta_r & 0 & x_{t3} \\ \sin\theta_r & \cos\theta_r & 0 & y_{t3} \\ 0 & 0 & 1 & z_{t3} \\ 0 & 0 & 0 & 1 \end{bmatrix} \tag{5}$$

The position and posture calculation unit 215 can obtain the positions of the plurality of contour points of the bucket 164 in the vehicle body coordinate system by obtaining a product of a sum of the positions ($x_{bk}$, $y_{bk}$, $z_{bk}$) of the plurality of contour points in the third tilt-rotate coordinate system indicated by the center position ($x_{t4}$, $y_{t4}$, $z_{t4}$) of the attachment surface of the bucket 164 and the geometric data of the bucket 164, and the third tilt-vehicle body transformation matrix $$T_{sb}^{bk}.$$

Incidentally, the angle of the teeth of the bucket 164 with respect to a grounding surface of the work machine 100, that is, an angle formed by an $X_{sb}$-$Y_{sb}$ plane of the vehicle body coordinate system and the $Y_{t3}$ axis of the third tilt-rotate coordinate system, is determined by the boom angle $\theta_{bm}$, the arm angle $\theta_{am}$, the bucket angle $\theta_{bk}$, the tilt angle $\theta_t$, and the rotation angle $\theta_r$. Accordingly, as shown in FIG. 1, the position and posture calculation unit 215 specifies the bucket coordinate system starting from the base end portion of the bucket 164, that is, the center position of the attachment surface of the bucket 164 in the tilt rotator 163. The bucket coordinate system is an orthogonal coordinate system formed of an $X_{bk}$ axis extending in a direction in which the teeth of the bucket 164 face, a $Y_{bk}$ axis orthogonal to the $X_{bk}$ axis and extending along the teeth of the bucket 164, and a $Z_{bk}$ axis orthogonal to the $X_{bk}$ axis and the $Y_{bk}$ axis. Hereinafter, the $X_{bk}$ axis will also be referred to as a bucket tilt axis, the $Y_{bk}$ axis will also be referred to as a bucket pitch axis, and the $Z_{bk}$ axis will also be referred to as a bucket rotation axis. The bucket tilt axis $X_{bk}$, the bucket pitch axis $Y_{bk}$, and the bucket rotation axis $Z_{bk}$ are virtual axes and are different from a joint shaft of the tilt rotator 163. In a case where the inclination of the rotary shaft of the rotary motor 310 is zero, the bucket coordinate system and the third tilt-rotate coordinate system match.

The position and posture calculation unit 215 generates a bucket-third tilt transformation matrix $$T_{t3}^{bk}$$

for performing transformation from the third tilt-rotate coordinate system to the bucket coordinate system by using Expression (6), based on the geometric data of the tilt rotator 163. The bucket-third tilt transformation matrix $$T_{t3}^{bk}$$

is a matrix for rotation by the inclination or of the rotary shaft around the $Y_{t3}$ axis.

$$T_{t3}^{bk} = \begin{bmatrix} \cos(-\phi_r) & 0 & \sin(-\phi_r) & 0 \\ 0 & 1 & 0 & 0 \\ -\sin(-\phi_r) & 0 & \cos(-\phi_r) & 0 \\ 0 & 0 & 0 & 1 \end{bmatrix} \tag{6}$$

<<Bucket Posture Holding Control>>

Hereinafter, the bucket posture holding control according to the first embodiment will be described. The bucket posture holding control is control for holding the posture of the bucket in the global coordinate system. With the bucket posture holding control, the tilt rotator 163 is controlled such that the posture of the bucket in the global coordinate system is held even in a case where at least one of the boom operation, the arm operation, and the swing operation is performed. Specifically, the bucket posture holding control is control for operating at least one of the bucket cylinder 308, the tilt cylinder 309, and the rotary motor 310 such that the axial directions of the three axes (the bucket tilt axis $X_{bk}$, the bucket pitch axis $Y_{bk}$, and the bucket rotation axis $Z_{bk}$) of the bucket coordinate system in the global coordinate system are held.

Figure 5:
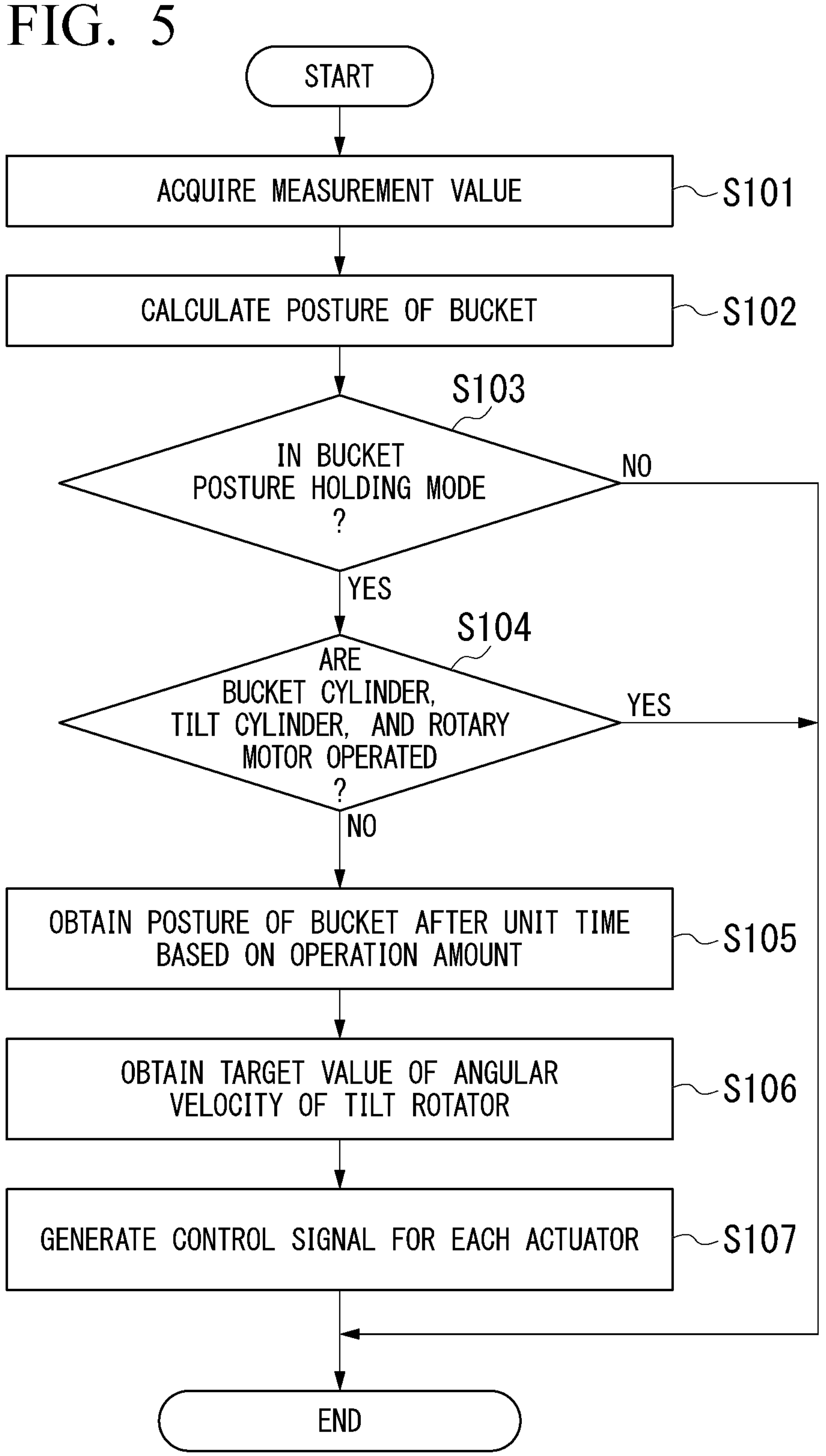
FIG. 5 is a flowchart showing bucket posture holding control in the first embodiment.

FIG. 5 is a flowchart showing the bucket posture holding control in the first embodiment. When the operator of the work machine 100 starts to operate the work machine 100, the control device 200 executes the following control for each predetermined control cycle (for example, 1000 milliseconds).

The measurement value acquisition unit 214 acquires the measurement values of the inclination measurer 401, the position and azimuth direction measurer 402, the boom angle sensor 403, the arm angle sensor 404, the bucket angle sensor 405, the tilt angle sensor 406, and the rotation angle sensor 407 (step S101).

The position and posture calculation unit 215 calculates the posture of the bucket in the vehicle body coordinate system based on the measurement values acquired in step S101 (step S102). The posture of the bucket in the vehicle body coordinate system is represented by a posture matrix $R_{cur}$ indicating the directions of respective axes ($X_{bk}$, $Y_{bk}$, $Z_{bk}$) of the bucket coordinate system in the vehicle body coordinate system. All translation components of the posture matrix $R_{cur}$ representing the posture of the bucket 164 are set to zero.

Next, the intervention determination unit 216 determines whether or not the bucket posture holding control is set (step S103). In the first embodiment, the intervention determination unit 216 determines whether or not the bucket posture holding control is set based on whether or not the input unit 212 has received an input for setting or releasing the bucket posture holding control from the monitor device 272. In a case where the bucket posture holding control is not set (step S103: NO), the control device 200 does not perform the bucket posture holding control. On the other hand, in a case where the bucket posture holding control is set (step S103: YES), the intervention determination unit 216 determines whether or not any operation of the bucket cylinder 308, the tilt cylinder 309, and the rotary motor 310 has been received, based on the operation signal from the operation device 271 acquired by the operation signal acquisition unit 211 (step S104).

In a case where any operation of the bucket cylinder 308, the tilt cylinder 309, and the rotary motor 310 has been received (step S104: YES), the control device 200 does not perform the bucket posture holding control because it is inferred that the operator has a will to operate the tilt rotator 163. On the other hand, in a case where none of the operations of the bucket cylinder 308, the tilt cylinder 309, and the rotary motor 310 have been received (step S104: NO), the intervention control unit 217 obtains a posture matrix $R_{man}$ representing the posture of the bucket 164 after a unit time (control cycle), based on the operation amounts of the swing motor 305, the boom 161, and the arm 162 acquired by the operation signal acquisition unit 211 from the operation device 271, and the measurement value of the inclination measurer 401 acquired by the measurement value acquisition unit 214 (step S105).

The posture matrix $R_{man}$ is represented by the current vehicle body coordinate system of the work machine 100. That is, the swinging of the swing motor 305 is reflected in the posture matrix $R_{man}$. Next, the intervention control unit 217 obtains a target value $\theta_{bk\_tgt}$ of the angular velocity of the bucket cylinder 308, a target value $\theta_{t\_tgt}$ of the angular velocity of the tilt cylinder 309, and a target value $\theta_{r\_tgt}$ of the angular velocity of the rotary motor 310 using Expressions (7) to (9), by using the posture matrix $R_{cur}$ of the bucket 164 calculated in step S102 and the posture matrix $R_{man}$ (step S106).

$$R_{man}^T R_{cur} = \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix} \tag{7}$$

$$\theta = \cos^{-1}\left(\frac{r_{11} + r_{22} + r_{33} - 1}{2}\right) \tag{8}$$

$$\begin{bmatrix} \theta_{t\_tgt} \\ \theta_{bk\_tgt} \\ \theta_{r\_tgt} \end{bmatrix} = \begin{cases} [0 \ 0 \ 0]^T & (|\theta| < \varepsilon) \\ KR_{man} \dfrac{\theta}{2\sin\theta} \begin{bmatrix} r_{32} - r_{23} \\ r_{13} - r_{31} \\ r_{21} - r_{12} \end{bmatrix} & (|\theta| \geq \varepsilon) \end{cases} \tag{9}$$

In Expression (7), ε indicates an error threshold value and K indicates a gain. Since a rotation matrix is an orthonormal matrix, a transposed matrix of the rotation matrix is equal to an inverse matrix of the rotation matrix. Therefore, according to Expressions (7) to (9), the intervention control unit 217 can obtain the angular velocities $\theta_{bk\_tgt}$, $\theta_{t\_tgt}$, and $\theta_{r\_tgt}$ for offsetting a difference between the current posture $R_{cur}$ of the bucket 164 and the posture $R_{man}$ of the bucket 164 when the actuator is actuated according to the operation amount acquired by the operation signal acquisition unit 211 from the operation device 271. The intervention control unit 217 generates control signals for the respective actuators (the bucket cylinder 308, the tilt cylinder 309, and the rotary motor 310) based on the target values of the angular velocities obtained in step S202 (step S107).

Then, the control signal output unit 218 outputs the control signals for the respective actuators (the bucket cylinder 308, the tilt cylinder 309, and the rotary motor 310) generated by the intervention control unit 217 to the control valve 303 (step S108).

<<Actions and Effects>>

In addition, according to the first embodiment, when the operator sets the posture holding control, the posture of the bucket 164 as seen from the global coordinate system can be held constant even when the swing body 140, the boom 161, and the arm 162 are operated. For example, in a case where a place sufficiently higher than the design surface is excavated, the teeth can be easily kept pointed in the excavation direction by maintaining the posture of the bucket 164. In addition, for example, in a case where an attachment such as a grapple is attached to the work equipment 160 instead of the bucket 164 to move a load, the tilt rotator is controlled such that the posture of the attachment in the global coordinate system is held, thereby preventing the load from falling due to the posture change.

In addition, when an operation signal for operating the tilt rotator 163, that is, an operation signal of any of the bucket cylinder 308, the tilt cylinder 309, and the rotary motor 310 is input, the control device 200 causes the intervention control unit 217 not to generate the control signal for the tilt rotator. The fact that the operation signal for operating the tilt rotator 163 is input by the operator means that the operator is highly likely to have a will to operate in the direction in which the bucket 164 faces. Therefore, in such a case, the control device 200 does not generate the control signal for the tilt rotator, so that the operator's operation is not hindered.

Modification Example of First Embodiment

In the first embodiment described above, the bucket posture holding control is set by the input unit 212 receiving an input of the setting of the bucket posture holding control from the monitor device 272. That is, in the first embodiment, the bucket posture holding control is started by an operation performed by the operator. However, in another aspect, there is no limitation to this aspect. For example, the control device 200 according to a modification example of the first embodiment may have the following functions.

The intervention determination unit 216 according to the modification example of the first embodiment starts the bucket posture holding control when the bucket 164 comes within a predetermined distance of the ground, as a setting condition for the bucket posture holding control.

For the determination of whether the bucket 164 has come within a predetermined distance of the ground, for example, the function of the intervention determination unit 216 described above can be used. That is, the intervention determination unit 216 obtains the shortest distance between the position of the teeth of the bucket 164 and the design surface from time to time. Then, the intervention determination unit 216 determines that a predetermined control start condition is satisfied when the shortest distance, which is calculated from time to time, becomes equal to or less than a predetermined determination threshold value while the bucket 164 is descending, and starts the process of step S104.

In this way, the operator's operation can be eliminated in executing the bucket posture holding control, and the ground leveling work or the like can be further simplified.

OTHER EMBODIMENTS

Although one embodiment has been described above in detail with reference to the drawings, the specific configuration is not limited to the above, and various design changes and the like can be made. That is, in another embodiment, the order of the above-described processes may be appropriately changed. In addition, some of the processes may be executed in parallel.

The control device 200 according to the above-described embodiment may be configured of a single computer, or the configurations of the control device 200 may be divided and disposed in a plurality of computers, and the plurality of computers may cooperate with each other to function as the control device 200. In this case, some computers constituting the control device 200 may be mounted inside the work machine, and other computers may be provided outside the work machine. For example, in another embodiment, the operation device 271 and the monitor device 272 are provided remotely from the work machine 100, and the configurations of the control device 200 other than the measurement value acquisition unit 214 and the control signal output unit 218 may be provided in the remote server.

In addition, the work machine 100 is a hydraulic excavator according to the above-described embodiment, but is not limited to this. For example, the work machine 100 according to another embodiment may be a work machine that is fixed on the ground and does not travel automatically. In addition, the work machine 100 according to another embodiment may be a work machine that does not have a swing body.

The work machine 100 includes the bucket 164 as the attachment of the work equipment 160 according to the above-described embodiment, but is not limited to this. For example, the work machine 100 according to another embodiment may include a breaker, a fork, a grapple, or the like as the attachment. In this case as well, similarly to the bucket coordinate system, the control device 200 controls the tilt rotator 163 by the local coordinate system formed of the $X_{bk}$ axis extending in the direction in which the teeth of the attachment face, the $Y_{bk}$ axis extending in the direction along the teeth, and the $Z_{bk}$ axis orthogonal to the $X_{bk}$ axis and the $Y_{bk}$ axis.

In addition, in another embodiment, the axes of the tilt rotator 163 need not be orthogonal to each other as long as the axes intersect each other in different planes. Specifically, with regard to an axis AX1 related to the joint shaft by which the arm 162 and the attachment portion 1631 are connected, an axis AX2 related to the joint shaft by which the attachment portion 1631 and the tilt portion 1632 are connected, and a rotation axis AX3 of the rotary motor 310, when the tilt angle and the rotation angle of the tilt rotator 163 is zero, a plane parallel to the axes AX1 and AX2, a plane parallel to the axes AX2 and AX3, and a plane parallel to the axes AX3 and AX1 need only be different from each other.

In addition, the control device 200 according to another embodiment may not have a setting function in terms of the design surface. In this case as well, the control device 200 can automatically control the tilt rotator 163 by performing the bucket posture holding control. For example, the operator can execute simple ground leveling work without setting the design surface.

INDUSTRIAL APPLICABILITY

According to the aspect described above, the system can assist with an operation of a work machine provided with an attachment supported by a support portion via a tilt rotator.

What is claimed is:

1. A system for controlling a work machine including a support portion operably supported by a vehicle body, a tilt rotator attached to a tip of the support portion, and an attachment supported rotatably around three axes that intersect each other in different planes, by the support portion via the tilt rotator, the system comprising:

a processor, wherein the processor is configured to;

acquire measurement values from a plurality of sensors, calculate a posture of the attachment with respect to the vehicle body based on the measurement values, generate a control signal for the tilt rotator to hold a direction of an attachment coordinate system on the attachment with respect to a global coordinate system, based on an operation signal from an operation device, and output the generated control signal.

2. The system according to claim 1, wherein the processor is configured to:

acquire an operation signal for operating the support portion from the operation device, and generate a control signal for the tilt rotator to hold the direction of the attachment coordinate system with respect to the global coordinate system, based on an operation amount indicated by the operation signal for operating the support portion.

3. The system according to claim 1, wherein the work machine further includes a base portion configured to swingably support the vehicle body, and wherein the processor is configured to;

acquire an operation signal for swinging the vehicle body with respect to the base portion from the operation device, and generate a control signal for the tilt rotator to hold the direction of the attachment coordinate system with respect to the global coordinate system, based on an operation amount indicated by the operation signal for swinging the vehicle body.

4. The system according to claim 1, wherein the processor is configured to calculate angular velocities around the three axes for the attachment to hold the posture, based on an operation amount indicated by the operation signal.

5. The system according to claim 1, wherein the processor is configured to, in a case where an operation signal for operating the tilt rotator is input from the operation device, output a control signal based on the input operation signal without outputting the generated control signal for the tilt rotator.

6. The system according to claim 1, wherein the attachment coordinate system is defined by the three axes including a tilt axis, a pitch axis, and a rotation axis that pass, and wherein the processor is configured to generate the control signal for the tilt rotator to hold an axial direction of each of the tilt axis, the pitch axis, and the rotation axis with respect to the global coordinate system.

7. A method for controlling a work machine including a base portion configured to swingably support a vehicle body, a support portion operably supported by the vehicle body, a tilt rotator attached to a tip of the support portion, and an attachment supported rotatably around three axes that intersect each other in different planes, by the support portion via the tilt rotator, the method comprising:

acquiring measurement values from a plurality of sensors;

calculating a posture of the attachment with respect to the vehicle body based on the measurement values;

generating a control signal for the tilt rotator to hold a direction of an attachment system defined at the attachment with respect to a global coordinate system, based on an operation signal from an operation device; and controlling the tilt rotator according to the generated control signal.

8. The method according to claim 7, further comprising:

in a case where an operation signal for operating the tilt rotator is input from the operation device, outputting a control signal based on the input operation signal without outputting the generated control signal for the tilt rotator.

9. A system for controlling a work machine including a support portion operably supported by a vehicle body, a tilt rotator attached to a tip of the support portion, and an attachment supported rotatably around three axes that intersect each other in different planes, by the support portion via the tilt rotator, the system comprising:

a processor, wherein the processor is configured to:

acquire measurement values from a plurality of sensors, calculate a posture of the attachment with respect to the vehicle body based on the measurement values, generate a control signal for the tilt rotator so that the posture of the attachment is held, based on an operation signal from an operation device, and output the generated control signal, and wherein the processor is configured to, in a case where an operation signal for operating the tilt rotator is input from the operation device, output a control signal based on the input operation signal without outputting the generated control signal for the tilt rotator.

* * * * *